(No Model.) 4 Sheets—Sheet 1.

J. J. HEYS.
BEATING OUT MACHINE.

No. 543,019. Patented July 23, 1895.

Witnesses:
Eugene Humphrey
L. W. Howks

Inventor:
John J. Heys
per T. W. Porter Atty (No Model.)  4 Sheets—Sheet 2.

J. J. HEYS.
BEATING OUT MACHINE.

No. 543,019.  Patented July 23, 1895.

Witnesses.  Inventor.

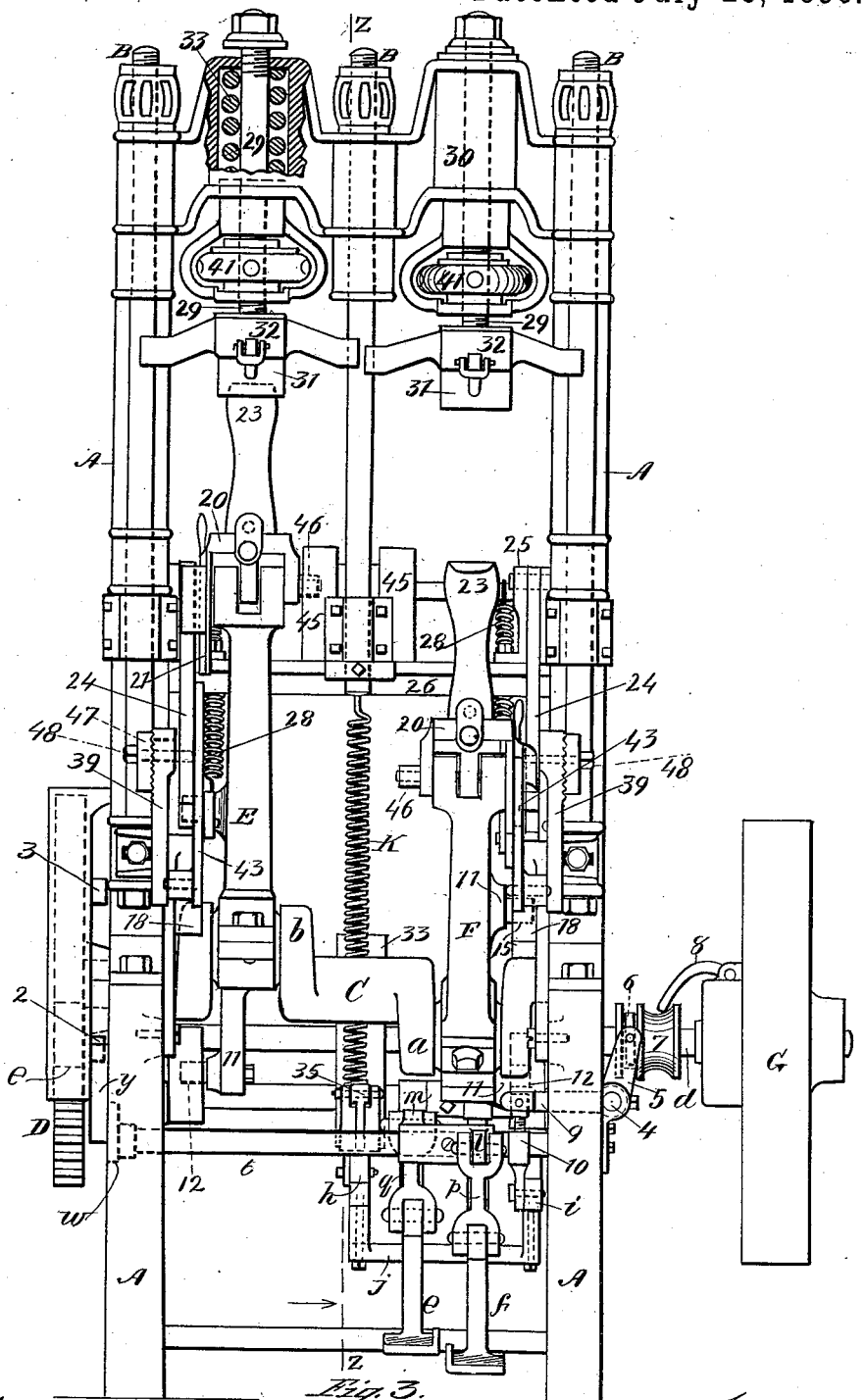

(No Model.)
J. J. HEYS.
BEATING OUT MACHINE.
No. 543,019. Patented July 23, 1895.
4 Sheets—Sheet 4.
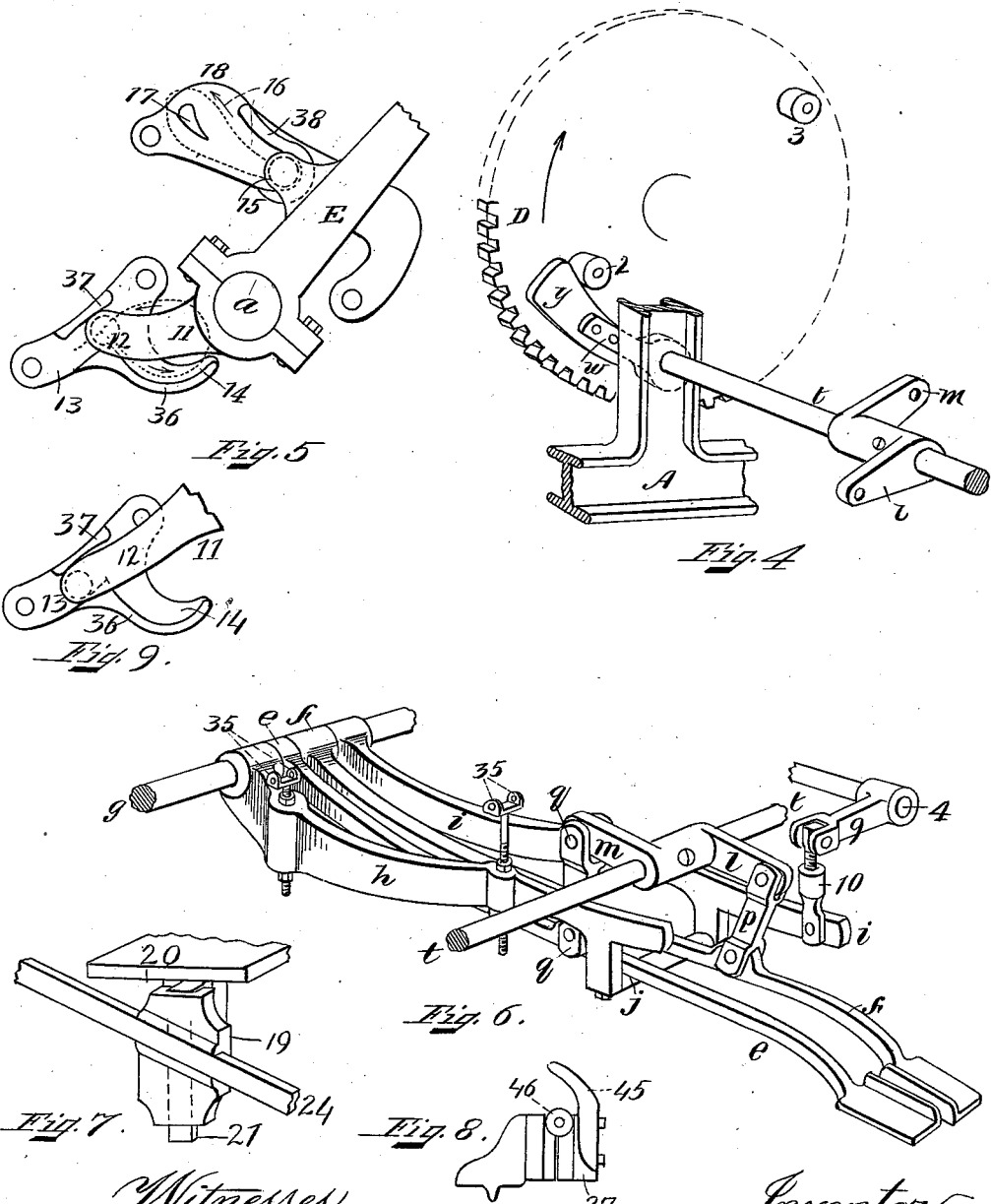

UNITED STATES PATENT OFFICE.

JOHN J. HEYS, OF LYNN, MASSACHUSETTS, ASSIGNOR OF ONE-HALF TO MAURICE V. BRESNEHAN, OF SAME PLACE.

BEATING-OUT MACHINE.

SPECIFICATION forming part of Letters Patent No. 543,019, dated July 23, 1895.

Application filed November 8, 1894. Serial No. 528,197. (No model.)

*To all whom it may concern:*

Be it known that I, JOHN J. HEYS, of Lynn, in the county of Essex and State of Massachusetts, have invented a new and useful Improvement in Beating-Out Machines, which will, in connection with the accompanying drawings, be hereinafter fully described, and specifically defined in the appended claims.

Figure 1:
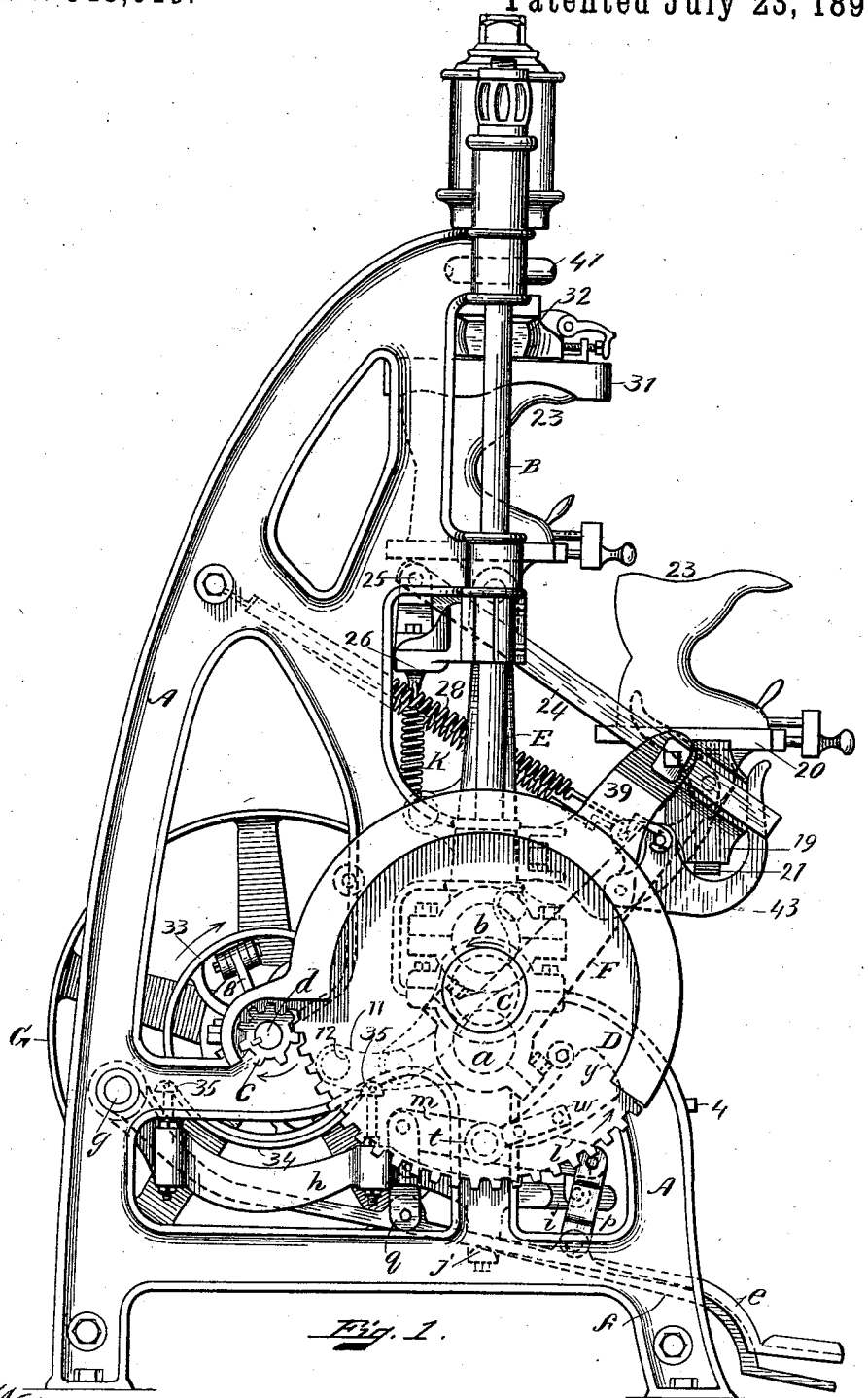
Figure 2:
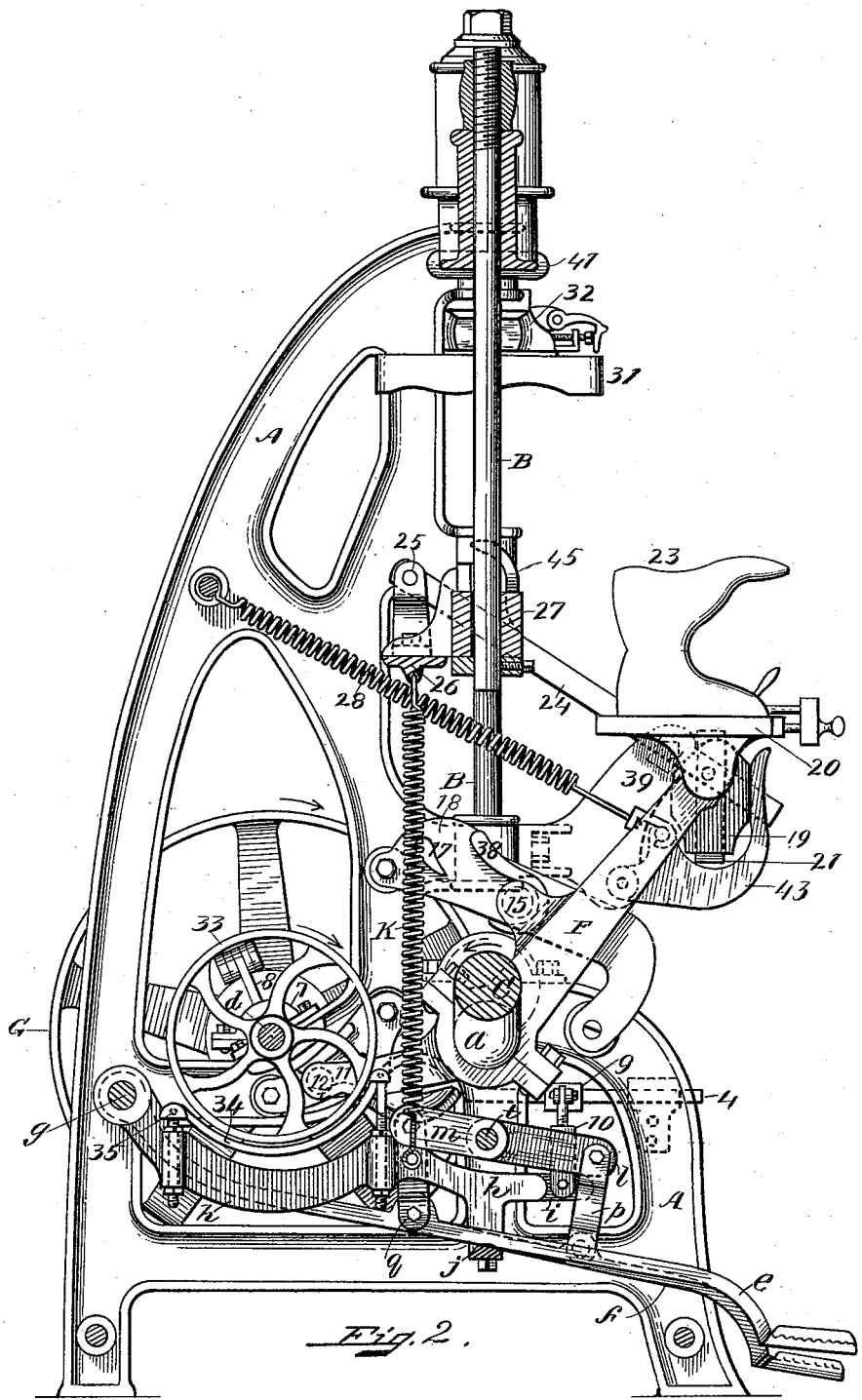

In said drawings, Figure 1 is a side elevation of my machine viewed as from the left and with one last in contact with its mold and the other last at its lowest position and as moved to the front. Fig. 2 is a sectional elevation, the section being taken as on line Z, Fig. 3, and the view as from the left of that figure. Fig. 3 is a front elevation of the machine, the moving parts being shown in the same position as in Fig. 1, except that the position of the lasts are reversed. Fig. 4 is a detached perspective view showing the main gear-wheel and the treadle-shifting device with its relation to said gear. Fig. 5 shows detached the lower portion of one of the last-carrying arms and coacting devices. Fig. 6 shows detached the treadles, the brake-shoe supports, the treadle-shifting devices, and the connection with the pulley-clutch device. Figs. 7, 8, and 9 show details that will be described.

The object of this invention is to beat out boots and shoes, which act consists in applying pressure to the soles to both give them proper form and to consolidate and smooth the same; and it consists in a machine provided with a suitable frame and having a two-throw crank-shaft driven through suitable gearing and with an arm mounted on each of said cranks, with means for pivoting a last upon the top of each of said arms, with means for holding such lasts at a level or at any desired angle while said arms vibrate in the arc of a circle while being raised and lowered, molds being arranged to be held above said lasts, so that the shoe upon the last is compressed between the same and said molds, said arms being vibrated by the action of the large gear, so as to be brought to a vertical position to be moved into contact with the molds above them and when lowered to be vibrated to the front, so as to be in convenient position for removal of the shoe from the last, two treadles being provided, as also a treadle and a clutch actuating and braking mechanism, so that as said treadles are alternately depressed the brake is released, the clutch locks the driving-pulley, and, if the treadle is so held depressed, the machine continues to move till the shoe on one arm is lowered at the front for removal of the shoe from the last while the other shoe is being compressed against the mold, the stopping of the machine being performed automatically, but the starting of the machine and the holding it in position to keep it moving till the rising shoe is in contact with its mold being due solely to the care, skill, and dexterity of the operator.

The starting and stopping devices shown in this application are claimed in my application, Serial No. 542,085, filed by me March 18, 1895.

Referring again to said drawings, A A represent the side frames of the machine, which are of such size and proportion as the work to be performed requires. At each side and centrally are arranged the stay and guide rods B, in a manner common and well known. Near the lower part of said frames is journaled the two-throw crank-shaft C, formed with throws $a$ and $b$. (Shown clearly in Fig. 3.) At the left-hand end, as seen in Fig 3, is secured large gear D on said crank-shaft.

At the rear of gear D is journaled a shaft $d$, that carries a small pinion $e$, which meshes with and imparts motion to said gear D and the various parts thereby driven. Said shaft $d$ extends across the machine and at the opposite end carries the clutch-pulley G, which is loose on said shaft, except when thereto clutched, as will be hereinafter explained.

The treadle mechanism consists of the right-hand treadle $f$ and the left-hand treadle $e$, respectively, pivoted on rod $g$, secured at the rear of frames A. Outside of said treadles are arranged the vertically-oscillating bars $h$ and $i$, pivoted on said rod $g$, and near their front ends united by bar $j$ beneath the treadles, so that as said treadles are successively depressed they carry down said bars $h$ $i$, which when released are raised by the helical spring $k$, attached to said bar $h$. Above bars $h$ $i$ and the treadles is a rock-shaft $t$ extending across the machine and having arms $l$ and $m$ extending therefrom on opposite sides, said arm $l$ being connected with treadle $f$ by stirrup $p$ and arm $m$ with treadle $e$ by stirrup $g$, as plainly shown in Fig. 6.

At the left hand of the machine, Figs. 1, 3, and 4, said rock-shaft $t$ extends through frame A and carries a short arm $w$ firmly and rigidly secured to it, to which is secured rocking-bar $y$, that extends into the paths of studs 2 and 3 on the inner face of gear D, so that stud 2 will depress said bar $y$, as shown in Fig. 4, thereby raising arm $l$ and depressing arm $m$, while roll 3, passing the under side of said bar $y$, will raise it and reverse the action of said arms $l$ $m$. A stirrup 10 connects the front end of bar $i$ with short arm 9, secured upon rock-shaft 4, journaled on the right-hand side of the machine, and which carries a rigid arm 5, having a trundle 6, that engages in a groove in collar 7, Fig. 3, that slides freely on shaft $d$, that carries pulley G, and is provided with a mechanism to clutch said shaft when it is actuated through curved arm 8, that is engaged in and is actuated by the sliding of hub 7. Said clutch and coacting parts are common and need not be further described. When the proper treadle is depressed by the operator, the frame $h$ $i$ is, by the action of the treadle on bar $j$, depressed and rocking bar $y$ is moved to a limited distance, and at the same time the clutch mechanism is actuated and shaft $d$ is rotated, thus putting the machine in operation, and when gear D brings roll 2 or 3, as the case may be, into contact with arm $y$, shaft $t$ is thereby actuated, the treadle is raised, thus allowing spring $k$ to raise frame $h$ $i$, releasing the clutch and bringing brake-shoe 34, secured in puppets 35, into contact with the brake-wheel 33 on shaft $d$, thereby stopping the machine, and as said treadles are alternately depressed, therefore the throws $a$ $b$ of crank C will be alternately raised and lowered.

Upon throws $a$ and $b$ of crank-shaft C are respectively mounted the arms E and F, each of which has an extension 11 below its connection with the shaft, each of which extensions carries at its lower end a roll 12, that will be between flanges 36 and 37, as shown in Fig. 9, when the crank-throw has nearly descended, but before the shoe mounted on its arm has been moved to the front; but when the crank-throw has fully descended and the shoe is moved to the front, as shown in Fig. 2, then said roll has risen and is in the position shown in Fig. 5, so that as roll 15 moves to the rear beneath flange 38 said roll 12 can move forward along flange 36, which serves to check the too-sudden rise of the shoe-carrying arm. Said arms E F also each carry a roll 15, that when the arm rises moves along beneath flange 38 on plate 18 and above projection 17, as indicated by the arrow 16, thence around projection 17 and below it and back to the seat in flange 38, said plate 18 being bolted to side frame A, the forward and back motions of rolls 12 and 15 being of course reverse the one to the other, as they are the one below and the other above the crank-shaft. Said arms E F at their upper ends are pivoted to the ears of last-block 20, as shown in Figs. 2 and 3, which block is connected with block 19 by slide 21. Said block 19 is connected with and arranged to slide on oblique bar 24, that at its rear end is bolted at 25 to an ear rising from girt 26, that is secured to coupling 27 secured to rods B, while at the front it is bolted to arm 39 extending from frame A, and when arms E and F are alternately moved upward by the crank-shaft block 19 moves upward upon bar 24, the contractile force of spring 28, secured to hooks 43, pivoted on arms E F, serving to cause the movement of block 19 along bars 24. Said hooks 43 at their free end bear against block 19 and serve to cushion the same.

When blocks 19 have reached their upper limit on guide-bars 24 the shoe upon the last will be directly under mold 31, but not in full contact with said mold, nor will the throw of the crank have reached its highest point. Hence the balance of the upward movement of such throw will move the last with the shoe thereon directly upward into the required contact with said mold to impart the requisite pressure upon the sole.

On last-block 20 is mounted lasts 23, which move with block 20 and always maintain their horizontal position.

At the top of the machine are the short rods 29, provided with slides 32, guided by rods B, and carrying molds 31, that coact with last 23 in shaping the shoe-sole. Said rods 29 are provided with adjusting-nuts 41, and when forced upward act against the compressive stress of springs 33, arranged in housings 30, in a well-known manner.

Upon the pin by which arms E F are pivoted to last-block 20, are arranged the rolls 46, which enter and move in the groove in coupling 27, Figs. 3 and 8, the roll, in conjunction with slide 21, Figs. 1, 2, and 7, serving to hold the last in its proper position for conjunction with the mold 31 when they are brought together. To protect rolls 46 and the grooves that they traverse from dirt, the curved shield-pieces 45 are secured to couplings 27 and extend backward far enough to prevent dirt from falling upon the roll or into the groove.

At the front end of oblique-bars 24, which are there supported by arm 39, a bolt 24 passes through a plate 47 and an elongated slot in arm 39 and is threaded in bar 24, said plate 47 and arm 39 being toothed, (see Fig. 3,) so that wherever the plate is positioned it will there be held fast. By this means the front end of bars 24 can be adjusted as to their height, as may be desired, and can be effectually locked in position by the means indicated.

It will be obvious that whenever the machine is at a standstill one or the other of rolls 2 or 3 on gear D will engage rock-bar $y$, and when so engaged but one of the treadles can be depressed to start the machine. Thus if roll 2, as shown in Fig. 4, is in contact with rock-bar *y*, then of course arm *l* of rock-shaft *t* could not be depressed, but arm *m* could be so depressed, and hence treadle *e* would be the one then next to be actuated to start the machine, which would bring roll 3 beneath rock-bar *y*, so that then treadle *f* would be next depressed, and so on alternately.

Having thus described my invention, what I claim as new, and desire to secure by Letters Patent, is—

1. The combination with the shoe compressing mechanism, consisting of the crank shaft with means for rotating it, the last carrying arms mounted on the cranks of said shaft, the lasts carried by said arms, a pair of coacting molds, and means substantially as described for guiding the movement of said arms in their ascent and descent, and mechanism for starting, running and stopping said compressing mechanism, all substantially as specified.

2. In a beating out machine the combination of the crank shaft, the levers E, F connected with and carried by said shaft, and the lasts arranged to be moved by said levers: an extension 11 of said levers below the throw of the crank shaft, the rolls 12, carried by said extension 11, flanges 36 and 37 arranged to guide said rolls to cause a downward movement of the lasts carried by levers E, F, to cause the roll 12, to assume a position at the intersecting angles of flange 36 when the crank throw is at the lowest point and roll 15 is in the seat in flange 38, as specified.

3. In a beating out machine of the class specified the arms E, F that carry the lasts, extended as at 11 below the crank shaft and rolls 12 pivoted in said extensions, and a flange 36 arranged for said roll to travel upon when the arm that extends above the crank shaft is moving rearward and upward, substantially as specified.

4. In a beating out machine, provided with arms E, F the combination of rolls 15 arranged on said arms above the crank shaft the guide plate 18 curved hook like at its front end to form a seat for said roll, and the projection 17 around which said roll moves, substantially as specified.

5. In a beating out machine, the combination of arms E, F carried by the crank shaft, the last blocks 20 pivoted to the top of said arms, the block 19 and its guide 21, the oblique arm 24 on which block 19 is arranged to slide and spring 28 arranged to cause the rising of the last block when said arms are moved upward by the crank, substantially as specified.

6. In a beating out machine the combination of blocks 19, the last block 20, the bars 24, arranged to support and guide said blocks 19 in their rising and falling motion substantially as specified.

7. In combination with last blocks 20, the slides 21, guides 19, in which slides 21 move, the rolls 46 and coupling 27 in the groove of which said roll 46 enters to coact with slide 21 in holding said block 20 in proper alignment, substantially as specified.

8. In a beating out machine, the combination of a crank shaft, the rigid arms E, F, carried by the crank shaft; and a last block mounted at the top of said arms, and arranged to be thereby moved into contact with a mold, and to the front, out of such contact, substantially as specified.

JOHN J. HEYS.

Witnesses:
 EUGENE HUMPHREY,
 THOMAS W. PORTER.